(12) United States Patent
Levenstein et al.

(10) Patent No.: US 10,472,101 B2
(45) Date of Patent: Nov. 12, 2019

(54) METHOD TO CERTIFY REUSE OF PRESSURIZED VESSELS

(71) Applicant: C.H. & I. Technologies, Inc., Santa Paula, CA (US)

(72) Inventors: Lawrence M. Levenstein, Los Angeles, CA (US); Eric A. Williams, Ojai, CA (US)

(73) Assignee: C.H. & I. Technologies, Inc., Santa Paula, CA (US)

(*) Notice: Subject to any disclaimer, the term of this patent is extended or adjusted under 35 U.S.C. 154(b) by 0 days.

(21) Appl. No.: 15/948,170

(22) Filed: Apr. 9, 2018

(65) Prior Publication Data

US 2018/0290773 A1  Oct. 11, 2018

Related U.S. Application Data

(60) Provisional application No. 62/484,210, filed on Apr. 11, 2017.

(51) Int. Cl.

| | |
|---|---|
| *F17C 5/06* | (2006.01) |
| *B65B 3/04* | (2006.01) |
| *G01M 3/32* | (2006.01) |
| *F17C 13/02* | (2006.01) |
| *B65B 31/00* | (2006.01) |
| *F17C 1/00* | (2006.01) |
| *B67D 1/00* | (2006.01) |
| *F17C 13/12* | (2006.01) |

(52) U.S. Cl.
CPC .............. *B65B 3/04* (2013.01); *B65B 31/003* (2013.01); *B67D 1/00* (2013.01); *F17C 1/00* (2013.01); *F17C 5/06* (2013.01); *F17C 13/025* (2013.01); *F17C 13/12* (2013.01); *G01M 3/32* (2013.01); *F17C 2221/014* (2013.01); *F17C 2221/031* (2013.01); *F17C 2223/0123* (2013.01); *F17C 2223/035* (2013.01); *F17C 2250/038* (2013.01); *F17C 2260/015* (2013.01); *F17C 2260/042* (2013.01)

(58) Field of Classification Search
CPC .... F17C 5/06; F17C 13/025; F17C 2250/038; F17C 13/12; F17C 1/00; F17C 2221/031; F17C 2221/014; F17C 2223/0123; F17C 2223/035; F17C 2260/042; F17C 2260/015; B65B 3/04; B65B 31/003; B67D 1/00; G01M 3/32

See application file for complete search history.

(56) References Cited

U.S. PATENT DOCUMENTS

2006/0221877 A1* 10/2006 Belanger ............... G01M 3/226
370/310

* cited by examiner

*Primary Examiner* — Nicolas A Arnett
(74) *Attorney, Agent, or Firm* — Fulwider Patton LLP

(57) ABSTRACT

The present invention is a method by which a reusable, refillable pressurized container used in consumer refillable packaging can be certified in a manner akin to single use containers. The certification calls for each receptacle to pass certain quality assurance measures, including automated testing and examination (100% receptacle testing and examination). In an exemplary case, the materials (fluids) in these receptacles will be for personal care or household use and will be non-regulated non-hazardous non-flammable non-corrosive materials (fluids), although the invention will not necessarily be so limited. The gases in these receptacles are preferably non-flammable compressed gases (compressed air or nitrogen) commercially free from corroding components.

7 Claims, 1 Drawing Sheet

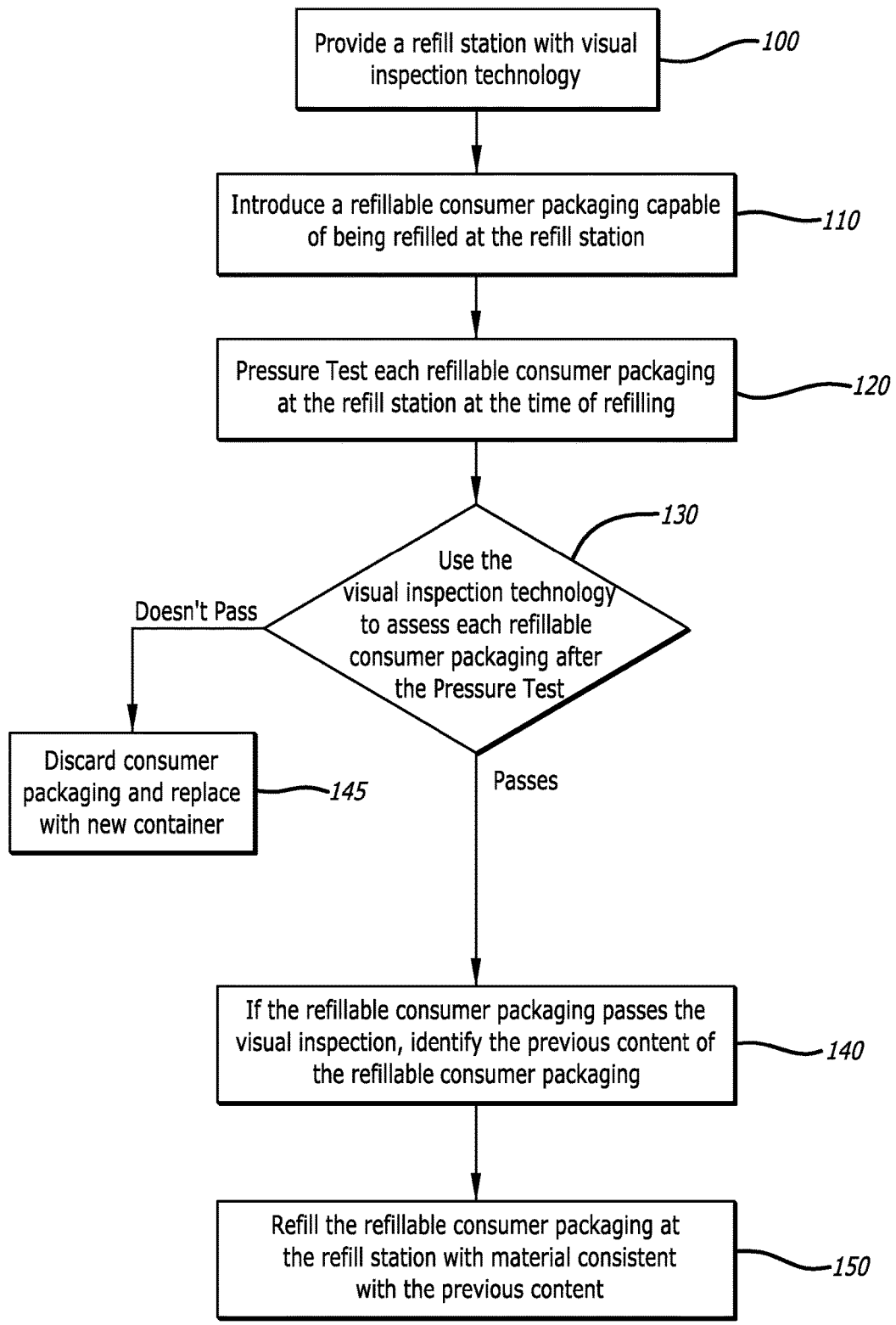

METHOD TO CERTIFY REUSE OF PRESSURIZED VESSELS

CROSS-REFERENCES TO RELATED APPLICATIONS

This application claims priority to U.S. Provisional Patent Application No. 62/484,210, filed Apr. 11, 2017, the content of which is fully incorporated herein by reference.

BACKGROUND

This invention relates to the testing and certification of certain pressure vessels in conformance with existing federal and state regulations, where the pressurization of the vessels prior to use will allow the vessels to be certified for refilling and reuse.

There exists specialized procedures for certifying certain pressurized vessels, such as 49 CFR 178.33 in the United States. That provision, which is a Federal regulation for single use containers, provides for "one out of each lot of 25,000 containers or less, successively produced per day shall be pressure tested to destruction and must not burst below 240 psig gauge pressure." However, there is no such provision for the refilling of multi-use, pressurized consumer product containers that can be refilled by a consumer using a refill kiosk. The applicant of the present invention believes that to better serve its clients and to further its goals of minimizing packaging waste and promoting refillable packaging, multi-use containers need to be introduced into the stream of commerce and must be certified in a different manner than single use containers. The present invention provides a method by which multi-use containers may be certified so that a confidence can be attached to the container that is at least a level of confidence as that of the single use container in view of the heightened loads and stresses that are present on a multi-use container.

SUMMARY OF THE INVENTION

The present invention is a method by which a reusable, refillable pressurized container used in consumer refillable packaging can be certified in a manner akin to single use containers. The certification calls for each receptacle to pass certain quality assurance measures, including automated testing and examination (100% receptacle testing and examination). In an exemplary case, the materials (fluids) in these receptacles will be for personal care or household use and will be non-regulated non-hazardous non-flammable non-corrosive materials (fluids), although the invention will not necessarily be so limited. The gases in these receptacles are preferably non-flammable compressed gases (compressed air or nitrogen) commercially free from corroding components.

In a first preferred embodiment, the reusable containers would include cans, valves (self-closing release devices), and bottom plugs, and a piston would be used to dispense the product from the container (can).

These, and other features of the invention, may best be understood with reference to the accompanying drawing, in conjunction with the detailed description of the preferred embodiments presented below.

BRIEF DESCRIPTION OF THE DRAWING

FIG. 1 is a flow chart of the method of the present invention.

DETAILED DESCRIPTION OF THE PREFERRED EMBODIMENTS

The present invention provides a detailed methodology for certifying consumer products for pressurization in refillable packaging. To aid in the understanding of the invention, reference is made to some existing regulations but the invention is not tied to or specifically correlated to any specific regulation. Further reference is made to FIG. 1, which illustrates a flow chart of the major steps to performing the certification and refilling operation.

The setting for the present invention is a provider of refillable consumer packaging, such as for example a pressurized body lotion dispenser (step 110). Many other products and opportunities can benefit from the present invention, and it is not limited in any manner to any particular product, package, or material. The provider or operator of the refill station/kiosk/procures the automated filling equipment (like vending machines) for filling the receptacles in a number of retail environments (step 100). This automated filling equipment tests and examines each receptacle (100% receptacle testing and examination) at the refill station at the time of refilling (step 120). The automated filling equipment tests each receptacle at two thirds of its design pressure limit, and examines it for leakage, permanent deformation, and other defects.

For example, the minimum test pressure for each 49 CFR 178.33 Specification 2P receptacle is 107.0 psig, and the minimum test pressure for each 49 CFR 178.33a Specification 2Q receptacle is 120.0 psig. According to the invention, the automated filling equipment examines each receptacle for permanent deformation and other defects with a Machine Vision (MV) system, with buckling of the receptacle bottom as a Region of Interest (ROI) for the MV system inspection (step 140). The automated filling equipment rejects each receptacle that fails the testing or examination (step 145), and a new container is substituted in its place.

Thereafter (e.g., years three through eight), the provider initially fills the receptacles with materials (fluids), compressing and pressurizing the gas inside the receptacles, with the automated filling equipment in a number of retail environments. The automated filling equipment ensures that the receptacles are suitable for the refilling, including the testing and examining of each receptacle (100% receptacle testing and examination). Each receptacle that fails this testing or examination is rejected from further use and is disposed of.

A filled receptacle is, in a first preferred embodiment, considered a Consumer Commodity. The materials (fluids) in these receptacles are for personal care or household use and are non-regulated non-hazardous non-flammable non-corrosive materials (fluids). The gases in these receptacles are Division 2.2 non-flammable compressed gases (compressed air or nitrogen) commercially free from corroding components. The automated filling equipment registers each receptacle by its unique serial number and records the material (fluid) filled in each receptacle (step 140).

Once certified, the consumers may then transport the filled receptacles from the retail environments by air, highway, rail, and water. It is the responsibility of the consumer to meet the requirements of any other applicable regulations for consumer commodities. The consumer dispenses and consumes/uses the materials (fluids) from the receptacles for personal care or household use. Once the material is expended, the consumers transports the substantially empty or empty receptacles by air, highway, rail, and/or water to the retail environments or other refill locations. The provider then re-fills the receptacles with materials (fluids), re-compressing and re-pressurizing the gas inside the receptacles, with the automated filling equipment in a number of retail environments.

The automated filling equipment further ensures that each receptacle is re-filled with the same materials (fluids) as each receptacle was initially filled with (step 150). This verification would be based on the registration of each receptacle and its unique serial number with the record of the material (fluid) initially filled in each receptacle. The receptacle can be re-filled numerous times, subject to it being suitable for refilling. After a certain prescribed number of years, the receptacles would be assigned for retirement and proper disposal of receptacles. If the calendar duration of the receptacles reaches or exceeds their stated maximum (e.g., 5 year) useful service life, then the provider would reject and retire any receptacles for refilling with the automated filling equipment and properly dispose of the receptacles. Moreover, if the consumer does not return the receptacle to the automated filling equipment in the retail environments, then it is the responsibility of the consumer to properly dispose of the receptacle.

The benefits of the present invention include significantly decreased material (fluid) waste and its associated costs. Without this relief, significant amounts of certain material (fluid) residues will continue to be discarded with non-refillable receptacles. Additionally, significantly decreased packaging (receptacle) waste and its associated costs are effected. Without this relief, significant quantities of certain receptacles will continue to be discarded.

In a first preferred embodiment, these receptacles are used in non-corrosive service where non-flammable compressed gases listed below commercially free from corroding components eject non-regulated non-hazardous non-flammable non-corrosive personal care or household use materials (fluids) from the receptacles. These cylinders are protected internally by a spray-in liner and externally by a suitable corrosion-resistant coating.

| Hazardous Material Description | | | |
|---|---|---|---|
| Proper Shipping Name | Hazard Class/Division | Identification Number | Packing Group |
| Air, compressed | 2.2 | UN1002 | N/A |
| Nitrogen, compressed | 2.2 | UN1066 | N/A |

The duration of the anticipated life cycle, such as an 8 year fixed period, is preferably based on the anticipated maximum useful service life of these receptacles. During this period, the supplier or manufacturer procures, initially owns, fills and tests, and examines each receptacle (100% receptacle testing and examination), and transfers ownership of these filled receptacles to consumers as consumer commodities. Concurrently, the supplier or manufacturer specifies the intended use of these receptacles, meeting the requirements of the special permit and DOT regulations. Consumers are then the subsequent owner of these receptacles, and could transport these receptacles by air, highway, rail, and water. At the end of the period, the provider retires and properly disposes of these receptacles, or it would be the responsibility of the consumers to properly dispose of these receptacles.

Transportation by air is needed to achieve the benefits from these consumer commodities in re-fillable receptacles so that they are consistent with transportation by air for these consumer commodities in non-refillable receptacles. Preferably, the receptacles weight less than 1 ounce weight/package, although it is understood that the receptacle would be used for transporting a material (fluid) for personal care or household use and would be nearly full of this material (fluid). The relatively much-smaller amount of compressed gas in the receptacle would be used as a "gas charge" to eject the relatively much-larger amount of material (fluid) from the receptacle).

Other as appropriate: The receptacle design would be similar to a typical piston barrier package design, and the physical characteristics of the cans would be as follows:

| Can Diameter | Can Height Range | Approximate Can Fill Volume Range | Planned Quantities of Refill Bottle Sizes |
|---|---|---|---|
| 45 mm | 120 mm-235 mm | 3 oz-8 oz | (104 million of 50 ml) |
| 45 mm | 120 mm-235 mm | 3 oz-8 oz | (69 million of 100 ml) |
| 50 mm | 120 mm-235 mm | 3.5 oz-10 oz | (11 million of 5 fl oz) |
| 50 mm | 120 mm-235 mm | 3.5 oz-10 oz | (23 million of 8 fl oz) |
| 53 mm | 120 mm-200 mm | 4.5 oz-11 oz | (None planned) |
| 55 mm | 120 mm-200 mm | 5.5 oz-12 oz | (11 million of 12 fl oz) |

This method would achieve a level of safety at least equal to the level of safety required by 49 CFR 178.33 and 49 CFR 178.33a for the containers covered by those regulations, because:

(a) It would decrease the overall quantity of unique receptacles that could be transported, decreasing the likelihood of a problem from higher quantities of unique receptacles;

(b) For those inherently more-hazardous flammable gases and toxic gases listed in the 49 CFR 172.101 Hazardous Materials Table; a special permit for these receptacles would be limited to these inherently less-hazardous atmospheric gases that are non-flammable, non-toxic, and commercially free from corroding components;

(c) After refilling each receptacle, each receptacle would be tested and examined (100% receptacle testing and examination) before each receptacle would be considered suitable for further use; and (d) Testing and examination at two thirds the design pressure has previously been an alternative test method to hot water bath testing.

Although the descriptions and embodiments described have identified certain preferred embodiments, it is to be understood that the invention is not limited to any particular embodiment, particularly as to size, shape, material, or fitness for a particular purpose. Rather, one of ordinary skill in the art would readily appreciate from the information disclosed herein certain modifications and substitutions to those embodiments described herein, and the invention is intended to include and incorporate all such modifications and substitutions without limitation.

We claim:

1. A method for certifying and refilling pressurized consumer packaging, comprising:

providing a refill station having a visual inspection system;

introducing a refillable consumer container that is refillable at the refill station;

pressure testing the refillable consumer container at the refill station to determine integrity prior to refilling the refillable consumer container;

using the visual inspection system to certify the refillable consumer container after the pressure testing;

discarding the refillable consumer container if it fails the visual inspection;

identifying a previous content of the refillable consumer container if it passes the visual inspection; and refilling the refillable consumer container with a compatible material to the previous content at the refill station.

2. The method for certifying and refilling pressurized consumer packaging of claim 1, wherein the pressure testing is two thirds of a design pressure limit of the refillable consumer container.

3. The method for certifying and refilling pressurized consumer packaging of claim 1, wherein the visual inspection system examines the refillable consumer container for leakage and deformation.

4. The method for certifying and refilling pressurized consumer packaging of claim 1, wherein pressurized consumer packing is pressurized with a non-flammable compressed non-corrosive gas.

5. The method for certifying and refilling pressurized consumer packaging of claim 1, wherein the non-flammable compressed non-corrosive gas is nitrogen.

6. The method for certifying and refilling pressurized consumer packaging packing of claim 1, wherein the identifying a previous content of the refillable consumer container uses a unique serial number to identify the previous contents.

7. The method for certifying and refilling pressurized consumer packaging of claim 1, wherein said refillable consumer containers are discarded after a specified number of uses and a specified duration after first use.

\* \* \* \* \*